United States Patent
Tiao et al.

(12) 
(10) Patent No.: US 6,582,082 B2
(45) Date of Patent: Jun. 24, 2003

(54) PROJECTION SYSTEM INCLUDING A COMPACT OPTICAL ENGINE HAVING ENHANCED HEAT DISSIPATING EFFICIENCY

(75) Inventors: Kuo-Tung Tiao, Hsin-Chu (TW); Cheng Wang, Hsin-Chu (TW)

(73) Assignee: Prokia Technology Co., Ltd, Tainan Hsien (TW)

( * ) Notice: Subject to any disclaimer, the term of this patent is extended or adjusted under 35 U.S.C. 154(b) by 0 days.

(21) Appl. No.: 10/008,817

(22) Filed: Nov. 13, 2001

(65) Prior Publication Data

US 2003/0090634 A1 May 15, 2003

(51) Int. Cl.[7] .................. G03B 21/18; G03B 21/16; G03B 21/26; G02F 1/1335; H04N 5/74
(52) U.S. Cl. ............... 353/57; 353/58; 353/61; 352/146; 349/5; 348/748
(58) Field of Search ............... 353/57, 58, 60, 353/61, 31, 33, 34, 37, 119; 352/146; 349/5; 348/748

(56) References Cited

U.S. PATENT DOCUMENTS

| | | | | |
|---|---|---|---|---|
| 6,007,205 A | * | 12/1999 | Fujimori et al. | 353/57 |
| 6,280,038 B1 | * | 8/2001 | Fuse et al. | 353/57 |
| 6,290,360 B1 | * | 9/2001 | Konuma et al. | 353/61 |
| 6,442,703 B1 | * | 7/2002 | Wang et al. | 353/61 |
| 6,443,575 B1 | * | 9/2002 | Miyamoto et al. | 353/58 |
| RE37,880 E | * | 10/2002 | Fujimori | 353/119 |
| 2001/0043312 A1 | * | 11/2001 | Fuse et al. | 353/57 |

* cited by examiner

Primary Examiner—Russell Adams
Assistant Examiner—Melissa J Koval
(74) Attorney, Agent, or Firm—Merchant & Gould P.C.

(57) ABSTRACT

In an optical engine for a projection system, a fan unit is mounted on an upper surface of a housing, and has an inlet port facing toward light modulators within the housing for drawing air upwardly so as to dissipate heat generated by the light modulators, and an outlet port that is transverse to the inlet port for discharging the air drawn into the inlet port.

10 Claims, 6 Drawing Sheets

PROJECTION SYSTEM INCLUDING A COMPACT OPTICAL ENGINE HAVING ENHANCED HEAT DISSIPATING EFFICIENCY

BACKGROUND OF THE INVENTION

1. Field of the Invention

The invention relates to a projection system, more particularly to a projection system including a compact optical engine having enhanced heat dissipating efficiency.

2. Description of the Related Art

Conventional portable projection devices are developed in the trend of compactness to enhance portability thereof. However, compactness may entail certain disadvantages. Referring to FIGS. 1, 2 and 3, in a conventional projection device 1, light from a projector lamp 11 is directed into a housing 201 of an optical engine 2 for processing. The processed light is projected via a projection lens 20 disposed at a front end of the housing 201 onto a display screen 293. During operation, the projector lamp 11 and certain components of the optical engine 2 will generate high heat. This is because the projector lamp 11 emits concentrated light which generates a large amount of heat, and the light from the projector lamp 11 which is incident on an image synthesizing area 27 within the housing 201 also produces heat. The heat must be dissipated to cool the relevant components. Otherwise, the color of the images to be projected, as well as the distribution of the light, will be adversely affected or, worse still, the relevant components will be severely damaged. Therefore, in the conventional projection device 1, a first fan 12 is disposed adjacent to the projector lamp 11 for extracting the heat generated by the projector lamp 11 rearwardly, and a second fan 21 is disposed at a bottom portion of the housing 201 for drawing cool air from below into the image synthesizing area 27 to dissipate the heat via a top portion of the housing 201 so as to lower the temperature of the image synthesizing area 27 within the housing 201. Operating power for the entire projection device 1 is supplied by a power supply unit 13 which is located in front of the projector lamp 11 and adjacent to the housing 201 in order to facilitate supply of power to the projector lamp 11 and the electronic circuits of the projection device 1. As the power supply unit 13 also produces heat during operation, and as the heat produced thereby cannot be effectively drawn out by means of the first fan 12 which is disposed to dissipate the heat generated by the projector lamp 11 and which is located at a relatively far position, a third fan 29 is provided adjacent to the power supply unit 13 to draw in cool air so as to ensure good heat dissipation.

During operation, light from the projector lamp 11 is guided into the housing 201 of the optical engine 2. A filter 22 is disposed in the housing 201 adjacent to a rear end of the housing 201 to filter the ultraviolet and infrared light components of the light from the projector lamp 11, thereby permitting passage of only white light therethrough. The white light passes through a pair of spaced-apart light integrator lenses 23 for conversion into evenly distributed light that subsequently passes through a polarization state converter 24. The polarized light is thereafter reflected by a mirror 25, and passes through two spaced-apart light splitters 261, 262, which split the white light into first, second and third color components (e.g., red, green and blue color components) that continue to proceed to the image synthesizing area 27. The first, second and third color components respectively reach first, second and third liquid crystal light valves 271, 272, 273 in the image synthesizing area 27 for light modulation. The modulated first, second and third color components are recombined by a light synthesizing prism 274 into an image beam, which is subsequently projected via the projection lens 20 onto the display screen 293.

In the conventional projection device 1 as described above, during light modulation of the first, second and third color components, since the light incident on the first, second and third light valves 271, 272, 273 is intense and generates high heat, and since relevant components like the liquid crystal components and polarizers within the housing 201 are vulnerable to high heat, an undue rise in temperature will result in abnormal operation and inferior color presentation, or even damage to the components. Therefore, a good heat dissipation system is needed. The second fan 21 described above is intended for this purpose and is mounted on the bottom portion of the housing 201 below the light valves 271, 272, 273 to dissipate heat.

With further reference to FIG. 2, the optical components that are disposed inside the optical engine 2 to process the light from the projector lamp 11 define a device axis 291. The projection lens 20 defines an image axis 292 that is offset from and that is at a slightly higher level than the device axis 291 so that the image beam is projected therefrom upwardly to achieve a projection effect such as that illustrated in FIG. 3, in which the light projected by the projection lens 20 onto the display screen 293 disposed vertically in front covers a projection field 294 that has a large portion located above the image axis 292 to facilitate viewing by a seated audience at eye level.

Given the aforesaid, the provision of the second fan 21 at the bottom portion of the housing 201 of the optical engine 2 increases the vertical thickness of the optical engine 2 and is therefore detrimental to the compactization of the projection device 1 as a whole.

In addition, since the second fan 2 draws a current of cool air upwardly in a single direction to dissipate the hot air inside the optical engine 2, an air vent has to be provided in the top portion of the housing 201. If the user inadvertently places an object, such as a document, on top of the housing 201 to thereby block the air vent, the light valves 271, 272, 273 and other components may overheat and become damaged.

SUMMARY OF THE INVENTION

Therefore, the primary object of the present invention is to provide an optical engine for use in a projection system, which is compact and which can enhance heat dissipating efficiency.

Another object of the present invention is to provide a projection system incorporating the aforesaid optical engine so as to overcome the above-mentioned drawbacks associated with the prior art.

According to one aspect of the present invention, an optical engine of this invention includes:

a housing having upper and lower surfaces, and front and rear ends;

a light splitting unit disposed in the housing adjacent to the rear end and adapted to split white light that enters the rear end of the housing into first, second and third color components;

first, second and third light modulators accommodated within the housing between the front and rear ends for respectively modulating the first, second and third color components received from the light splitting unit;

a color synthesizing prism disposed in the housing adjacent to the first, second and third light modulators for recombining the first, second and third color components modulated by the first, second and third light modulators to form an image beam;

a projection lens disposed at the front end of the housing and adapted to project the image beam onto a display screen; and a fan unit mounted on the upper surface of the housing, the fan unit having an inlet port facing toward the first, second and third light modulators for drawing air upwardly so as to dissipate heat generated by the first, second and third light modulators, the fan unit further having an outlet port that is transverse to the inlet port for discharging the air drawn into the inlet port.

According to another aspect of the present invention, a projection system of this invention includes:

a housing having upper and lower surfaces, and front and rear ends;

a light source disposed adjacent to the rear end of the housing and operable so as to supply white light;

a light splitting unit disposed in the housing adjacent to the rear end for splitting the white light from the light source into first, second and third color components;

first, second and third light modulators accommodated within the housing between the front and rear ends for respectively modulating the first, second and third color components received from the light splitting unit;

a color synthesizing prism disposed in the housing adjacent to the first, second and third light modulators for recombining the first, second and third color components modulated by the first, second and third light modulators to form an image beam;

a projection lens disposed at the front end of the housing and adapted to project the image beam onto a display screen;

a power supply unit disposed on one side of the housing adjacent to the light source to supply power to the projection system;

a first fan unit mounted adjacent to the light source to draw hot air away from the light source; and a second fan unit mounted on the upper surface of the housing, the fan unit having an inlet port facing toward the first, second and third light modulators for drawing air upwardly so as to dissipate heat generated by the first, second and third light modulators, the second fan unit further having an outlet port that is transverse to the inlet port for discharging the air drawn into the inlet port toward the power supply unit such that the air from the second fan unit can carry hot air around the power supply unit toward the light source for extraction by the first fan unit.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
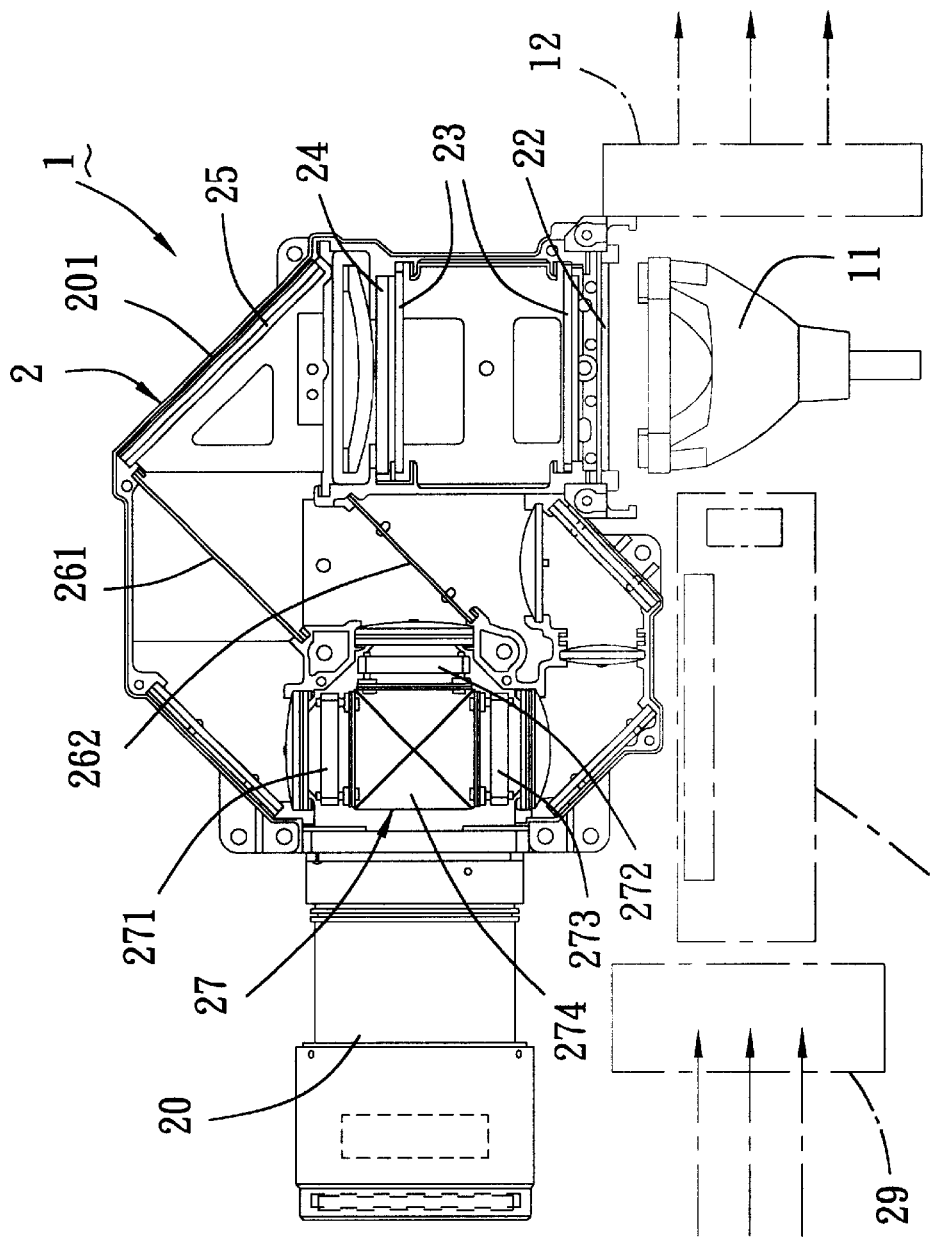
FIG. 1 is a schematic top view showing an optical engine in a conventional projection device.
Figure 2:
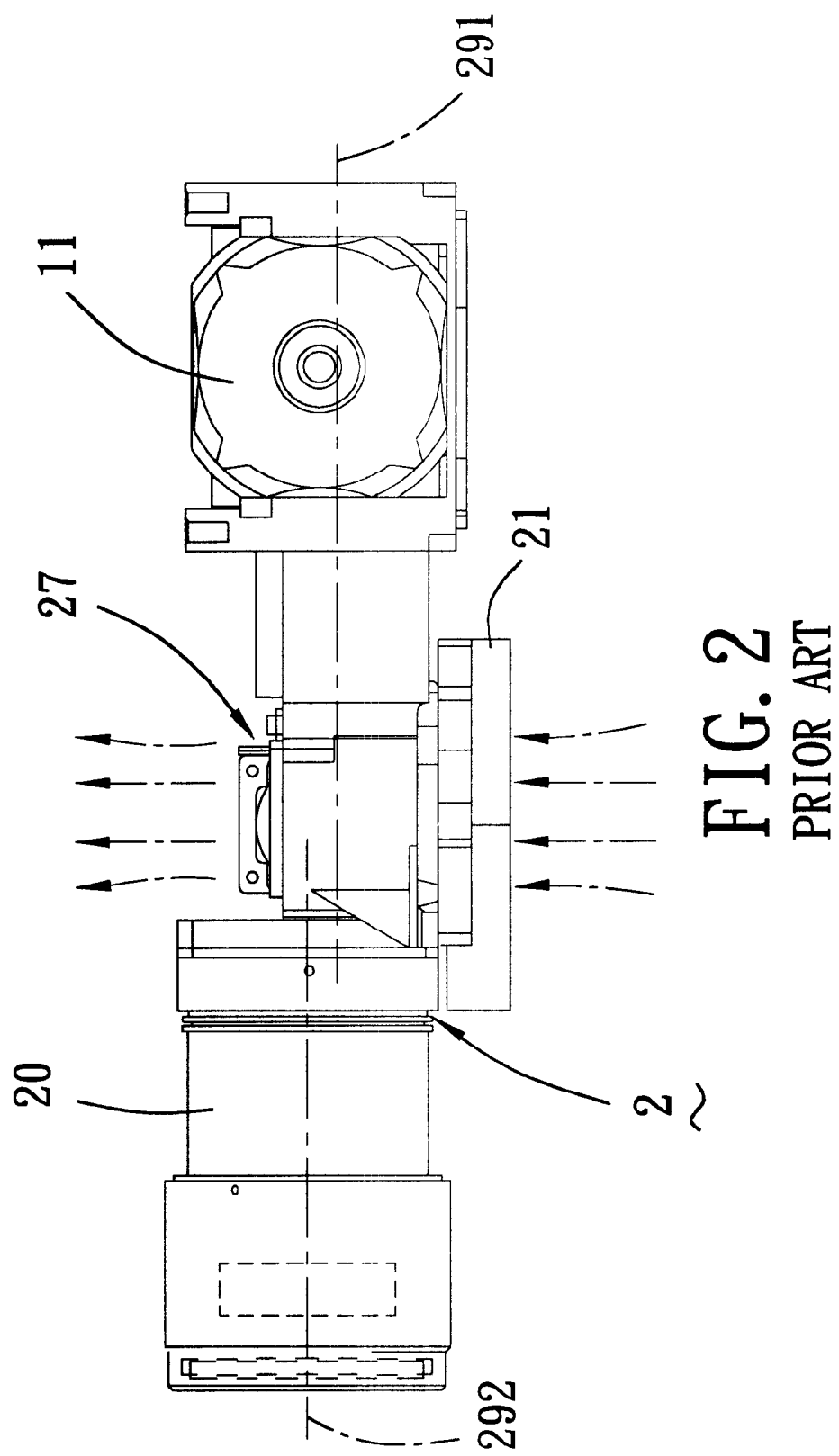
FIG. 2 is a schematic side view of the optical engine in the conventional projection device.
Figure 3:
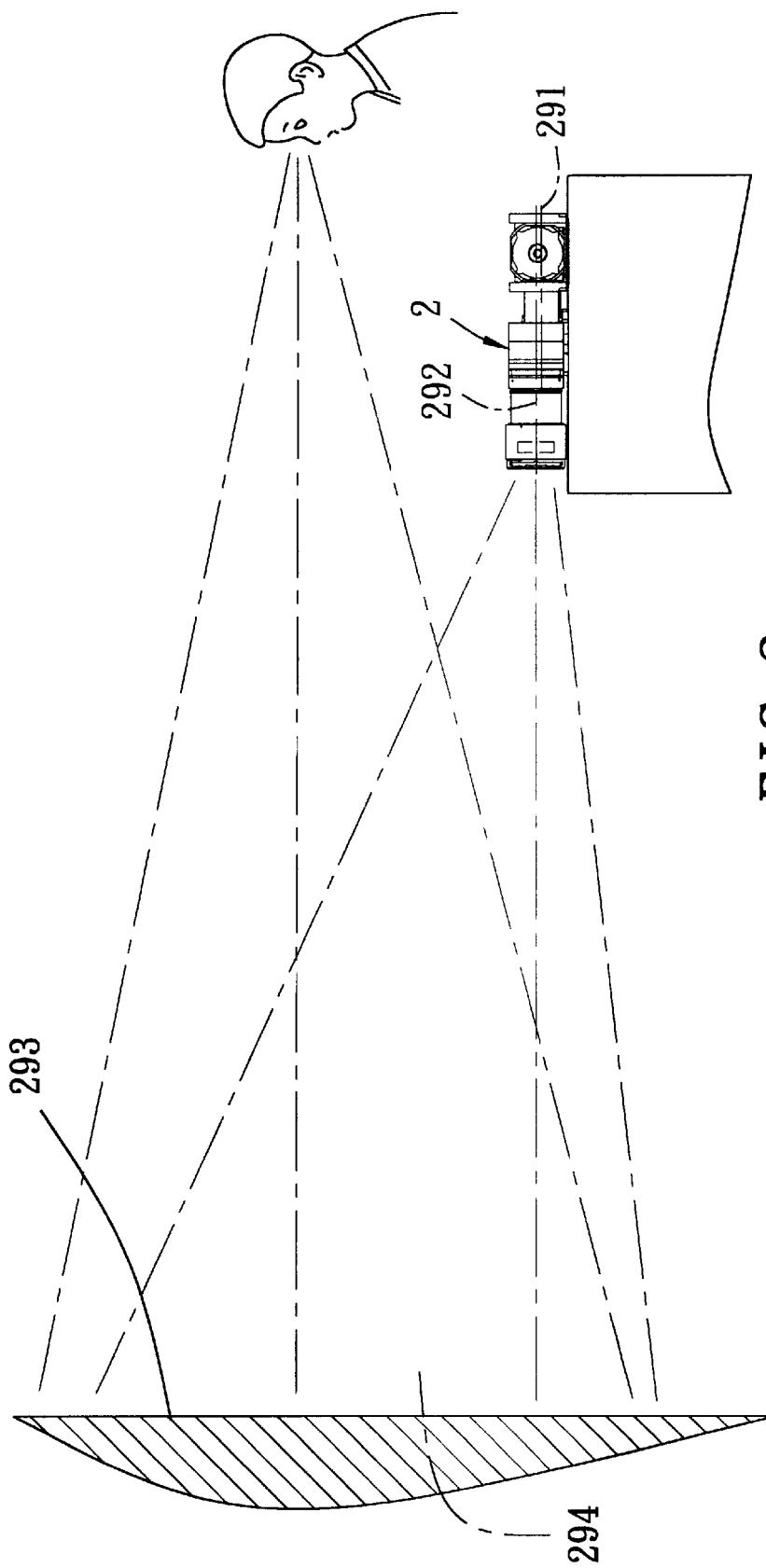
FIG. 3 is a schematic view illustrating the conventional projection system in a state of use, in which an image axis of a projection lens is offset and is at a slightly higher level than a device axis of the optical engine.
Figure 4:
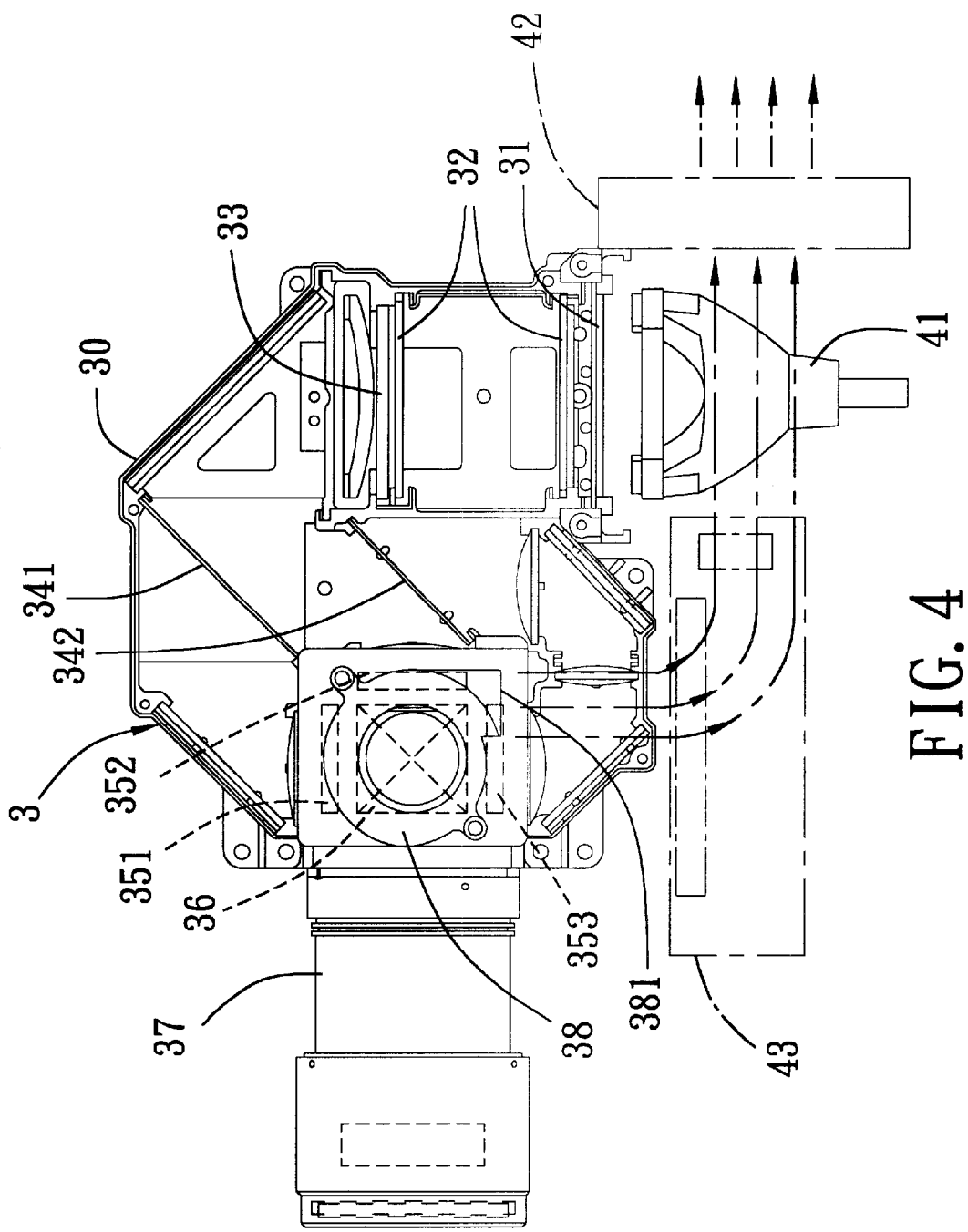
FIG. 4 is a schematic top view of a preferred embodiment of a projection system having an optical engine according to the invention.
Figure 5:
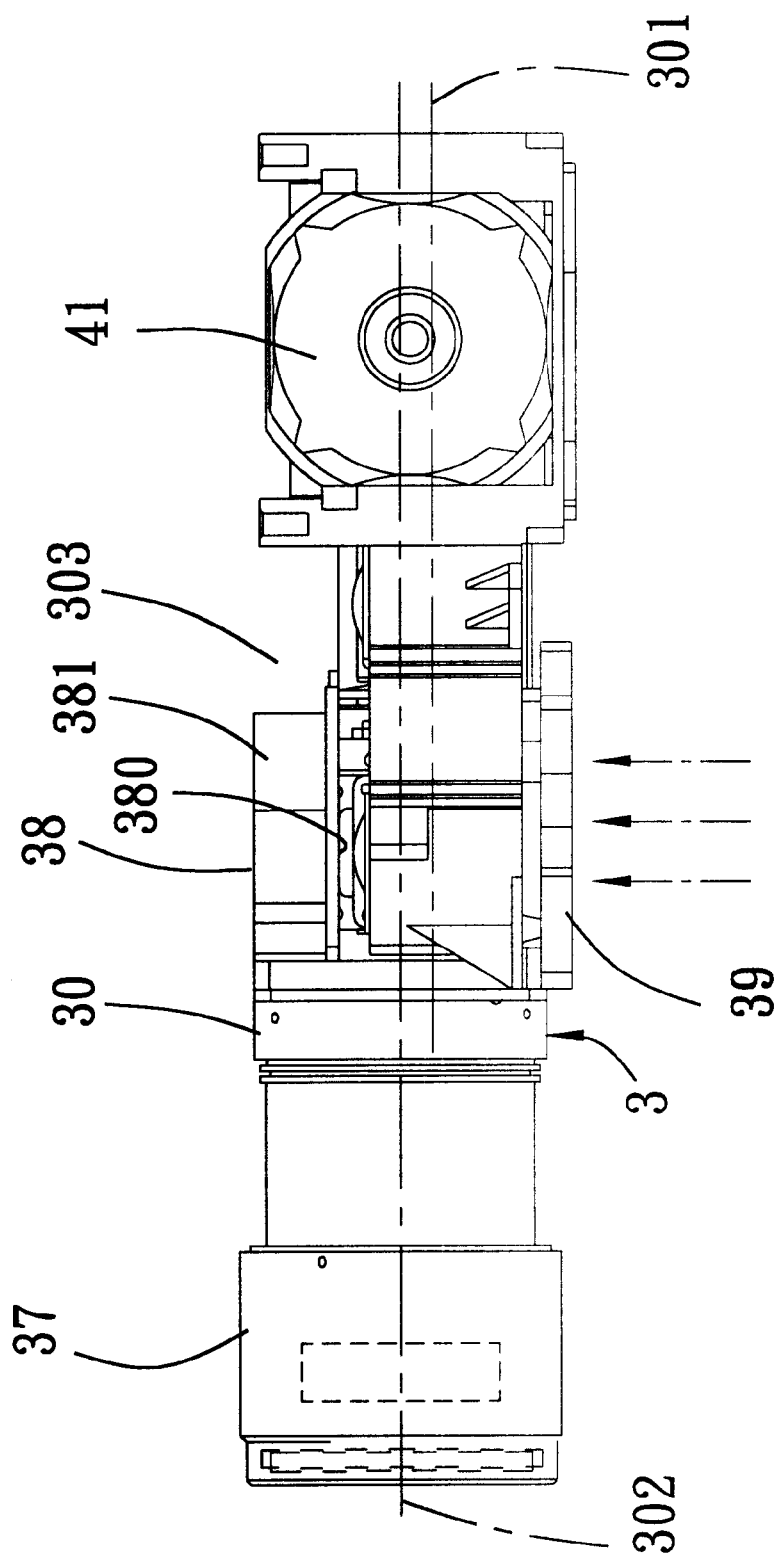
FIG. 5 is a schematic side view of the preferred embodiment.

Referring to FIGS. 4 and 5, the preferred embodiment of a projection system according to the present invention is shown to include an optical engine 3 having a housing 30 with upper and lower surfaces, and front and rear ends. A light source 41 is disposed adjacent to the rear end of the housing 30 and is operable so as to supply white light to the optical engine 3. In this embodiment, the light source 41 is in the form of a projector lamp. A power supply unit 43 is disposed on one side of the housing 30 adjacent to the light source 41 to supply power to the entire projection system. A first fan unit 42 is mounted adjacent to the light source 41 distal to the power supply unit 43 to draw hot air away from the light source 41 and to simultaneously extract the hot air around the power supply unit 43.

During operation, the light from the light source 41 passes through a filter 31 disposed within the housing 30 adjacent to the rear end. The filter 31 filters the ultraviolet and infrared light components of the light, thereby permitting only pure white light to pass therethrough. A pair of spaced-apart light integrators 32 and a polarization state converter 33 are disposed within the housing 30 to respectively integrate the white light from the filter 31 into evenly distributed light and convert the polarization state of the white light. A light splitting unit consisting of two light splitters 341, 342 is disposed in the housing 30 adjacent to the rear end for splitting the white light from the polarization state converter 33 into first, second and third color components (e.g., red, green and blue color components). First, second and third light modulators 351, 352, 353 are accommodated within the housing 30 between the front and rear ends for respectively modulating the first, second and third color components received from the light splitting unit. In this embodiment, the first, second and third light modulators 351, 352, 353 are liquid crystal light valves. A color synthesizing prism 36 is disposed in the housing 30 adjacent to the first, second and third light modulators 351, 352, 353 for recombining the first, second and third color components modulated by the first, second and third light modulators 351, 352, 353 to form an image beam. The image beam is projected via a projection lens 37 disposed at the front end of the housing 30 onto a display screen (not shown).

In the invention, the optical components disposed within the housing 30, including the light splitters 341, 342 of the light splitting unit, the light modulators 351, 352, 353, and the prism 36 define a device axis 301. The projection lens 37 defines an image axis 302 that is offset from and that is disposed at a level slightly higher than the device axis 301 so that the image beam is projected therefrom upwardly. As such, the lower surface of the housing 30 of the optical engine 3 at the rear end of the housing 30 is at a lower position compared to a bottom surface of the projection lens 37 at a front end thereof. On the other hand, the upper surface of the housing 30 at the rear end is at a lower position compared to an upper surface of the projection lens 37 at the front end, thereby forming a depressed area 303 for mounting a second fan unit 38 such that an upper surface of the second fan unit 38 is substantially flush with the upper surface of the projection lens 37.

In this embodiment, the second fan unit 38 is a high pressure-difference blower type extractor fan, and has an inlet port 380 facing toward the first, second and third light modulators 351, 352, 353 for drawing air upwardly so as to dissipate heat generated by the first, second and third light modulators 351, 352, 353, as well as other optical components in the vicinity. The second fan unit 38 further has an outlet port 381 that is transverse to the inlet port 380 on a lateral side of the second fan unit 38 for discharging the air drawn into the inlet port 380 toward the power supply unit 43 such that the air discharged from the second fan unit 38 can carry hot air around the power supply unit 43 toward the light source 41 for extraction by the first fan unit 42.

As the second fan unit 38 is mounted on the housing 30 at the depressed area 303 and has the upper surface thereof flush with the upper surface of the projection lens 37, it will not increase the vertical thickness of the optical engine 3. Furthermore, since the outlet port 381 of the second fan unit 38 is disposed transverse to the inlet port 380 and laterally of the second fan unit 38, there is no need to provide an air vent in the upper surface of the housing 30. Therefore, the problem associated with air vent blocking in the prior art will not be encountered in this invention. In addition, as the outlet port 381 of the second fan unit 38 is oriented toward the power supply unit 43, the heat generated by the power supply unit 43 can be carried toward the first fan unit 42 for extraction, thereby achieving enhanced heat dissipating efficiency and obviating the need for a third fan, which is necessary in the prior art.

Figure 7:
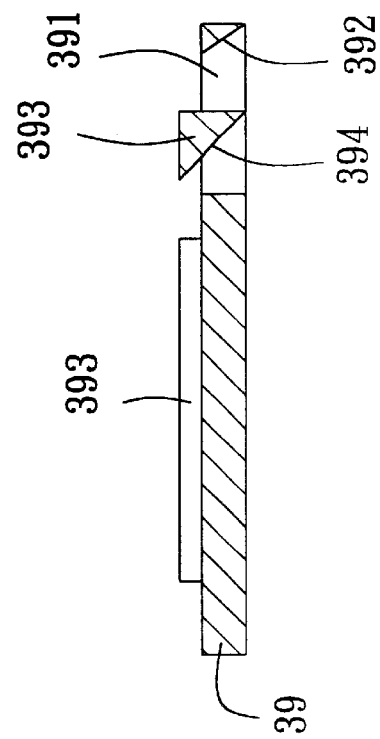
FIG. 7 is an enlarged sectional view of the air guide member of the optical engine of the preferred embodiment, taken along line VII—VII of FIG. 6.
Figure 6:
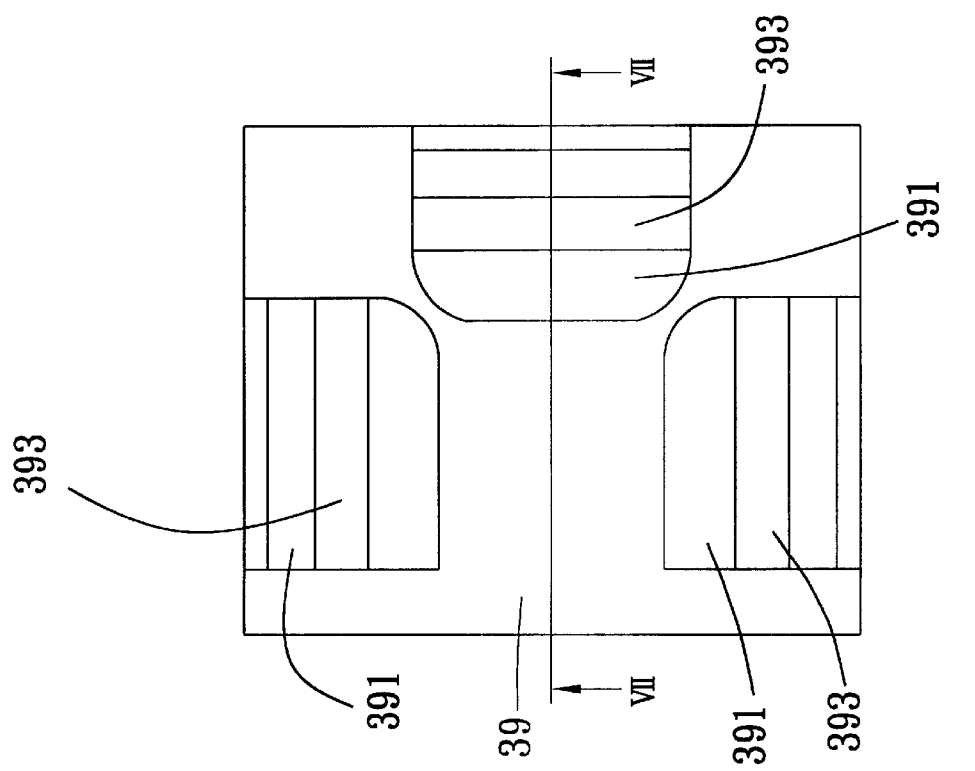
FIG. 6 is an enlarged top view of an air guide member of the optical engine of the preferred embodiment.

With further reference to FIGS. 6 and 7, in combination with FIG. 5, the optical engine 3 further includes an air guide member 39 mounted on the lower surface of the housing 30 and formed with first, second and third air vents 391 that are registered with the first, second and third light modulators 351, 352, 353, respectively. Each of the first, second and third air vents 391 has an inclined first guiding surface 392. The air guide member 39 includes first, second and third guiding blocks 393, each of which straddles over a respective one of the first, second and third air vents 391 and is formed with an inclined second guiding surface 394. When the second fan unit 38 is actuated to draw air upwardly, the first and second guiding surfaces 392, 394 direct the air flowing through the air guide member 39 toward the first, second and third light modulators 351, 352, 353 to thereby enhance the heat dissipating effect.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. An optical engine for a projection system, said optical engine comprising:

a housing having upper and lower surfaces, and front and rear ends;

a light splitting unit disposed in said housing adjacent to said rear end and adapted to split white light that enters said rear end of said housing into first, second and third color components;

first, second and third light modulators accommodated within said housing between said front and rear ends for respectively modulating said first, second and third color components received from said light splitting unit;

a color synthesizing prism disposed in said housing adjacent to said first, second and third light modulators for recombining said first, second and third color components modulated by said first, second and third light modulators to form an image beam;

a projection lens disposed at said front end of said housing and adapted to project said image beam onto a display screen; and a fan unit mounted on said upper surface of said housing, said fan unit having an inlet port facing toward said first, second and third light modulators for drawing air upwardly so as to dissipate heat generated by said first, second and third light modulators, said fan unit further having an outlet port that is transverse to said inlet port for discharging the air drawn into said inlet port.

2. The optical engine of claim 1, wherein said light splitting unit, said light modulators and said prism define a device axis, said projection lens defining an image axis that is offset from and that is disposed at a level slightly higher than said device axis.

3. The optical engine of claim 1, wherein each of said light modulators is a liquid crystal light valve.

4. The optical engine of claim 1, further comprising an air guide member mounted on said lower surface of said housing and formed with first, second and third air vents that are registered with said first, second and third light modulators, respectively.

5. The optical engine of claim 4, wherein each of said first, second and third air vents has an inclined first guiding surface, said air guide member including first, second and third guiding blocks, each of which straddles over a respective one of said first, second and third air vents and is formed with an inclined second guiding surface, said first and second guiding surfaces directing air flow through said air guide member toward said first, second and third light modulators.

6. A projection system, comprising:

a housing having upper and lower surfaces, and front and rear ends;

a light source disposed adjacent to said rear end of said housing and operable so as to supply white light;

a light splitting unit disposed in said housing adjacent to said rear end for splitting the white light from said light source into first, second and third color components;

first, second and third light modulators accommodated within said housing between said front and rear ends for respectively modulating said first, second and third color components received from said light splitting unit;

a color synthesizing prism disposed in said housing adjacent to said first, second and third light modulators for recombining said first, second and third color components modulated by said first, second and third light modulators to form an image beam;

a projection lens disposed at said front end of said housing and adapted to project said image beam onto a display screen;

a power supply unit disposed on one side of said housing adjacent to said light source to supply power to said projection system;

a first fan unit mounted adjacent to said light source to draw hot air away from said light source; and a second fan unit mounted on said upper surface of said housing, said fan unit having an inlet port facing toward said first, second and third light modulators for drawing air upwardly so as to dissipate heat generated by said first, second and third light modulators, said second fan unit further having an outlet port that is transverse to said inlet port for discharging the air drawn into said inlet port toward said power supply unit such that the air from said second fan unit can carry hot air around said power supply unit toward said light source for extraction by said first fan unit.

7. The projection system of claim 6, wherein said light splitting unit, said light modulators and said prism define a device axis, said projection lens defining an image axis that is offset from and that is disposed at a level slightly higher than said device axis.

8. The projection system of claim 6, wherein each of said light modulators is a liquid crystal light valve.

9. The projection system of claim 6, further comprising an air guide member mounted on said lower surface of said housing and formed with first, second and third air vents that are registered with said first, second and third light modulators, respectively.

10. The projection system of claim 9, wherein each of said first, second and third air vents has an inclined first guiding surface, said air guide member including first, second and third guiding blocks, each of which straddles over a respective one of said first, second and third air vents and is formed with an inclined second guiding surface, said first and second guiding surfaces directing air flow through said air guide member toward said first, second and third light modulators.

* * * * *